Dec. 10, 1940.　　　L. M. PLYM ET AL　　　2,224,609
PROGRAM APPARATUS
Filed Sept. 23, 1938　　　2 Sheets-Sheet 1
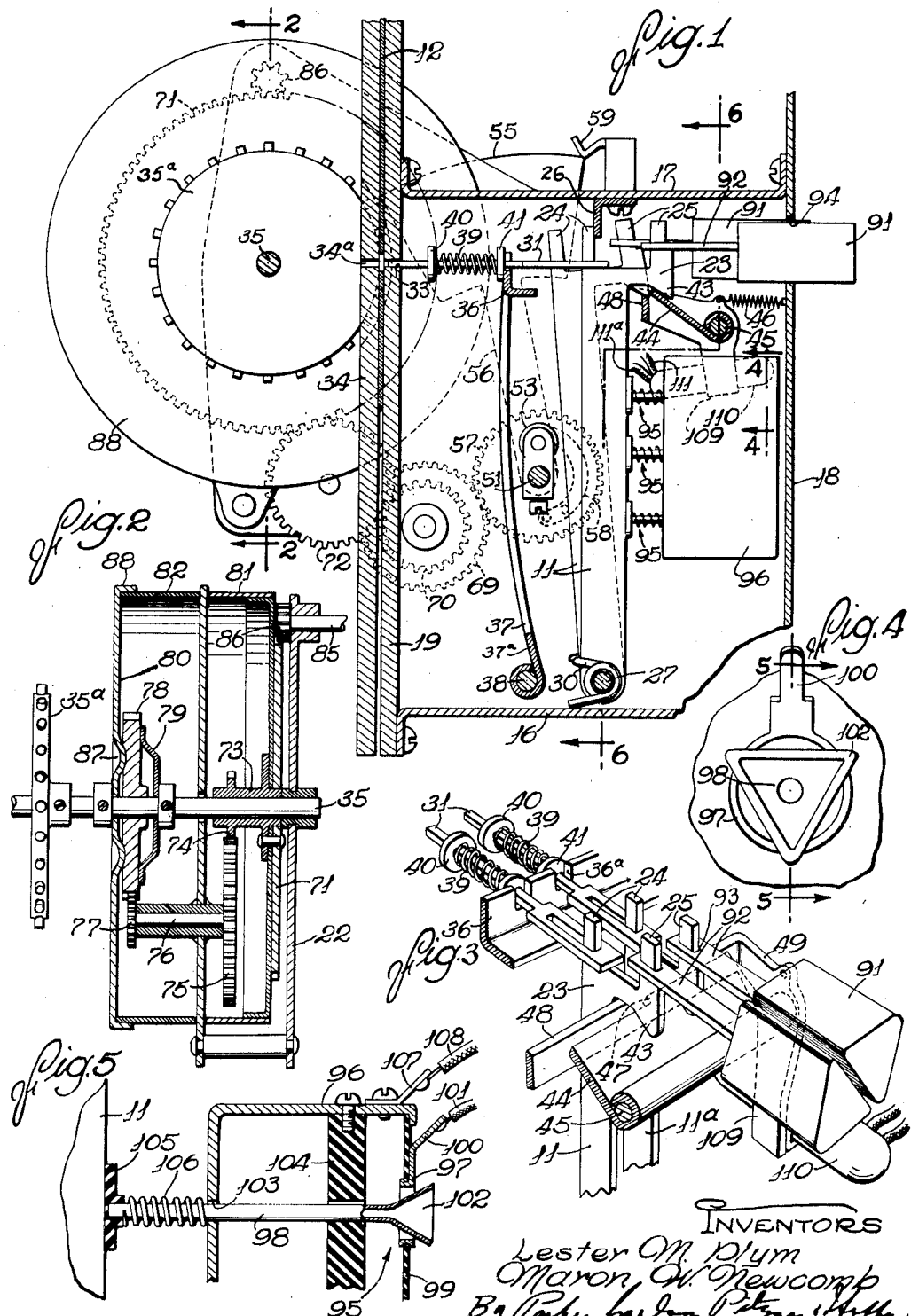

Dec. 10, 1940.  L. M. PLYM ET AL  2,224,609
PROGRAM APPARATUS
Filed Sept. 23, 1938    2 Sheets-Sheet 2
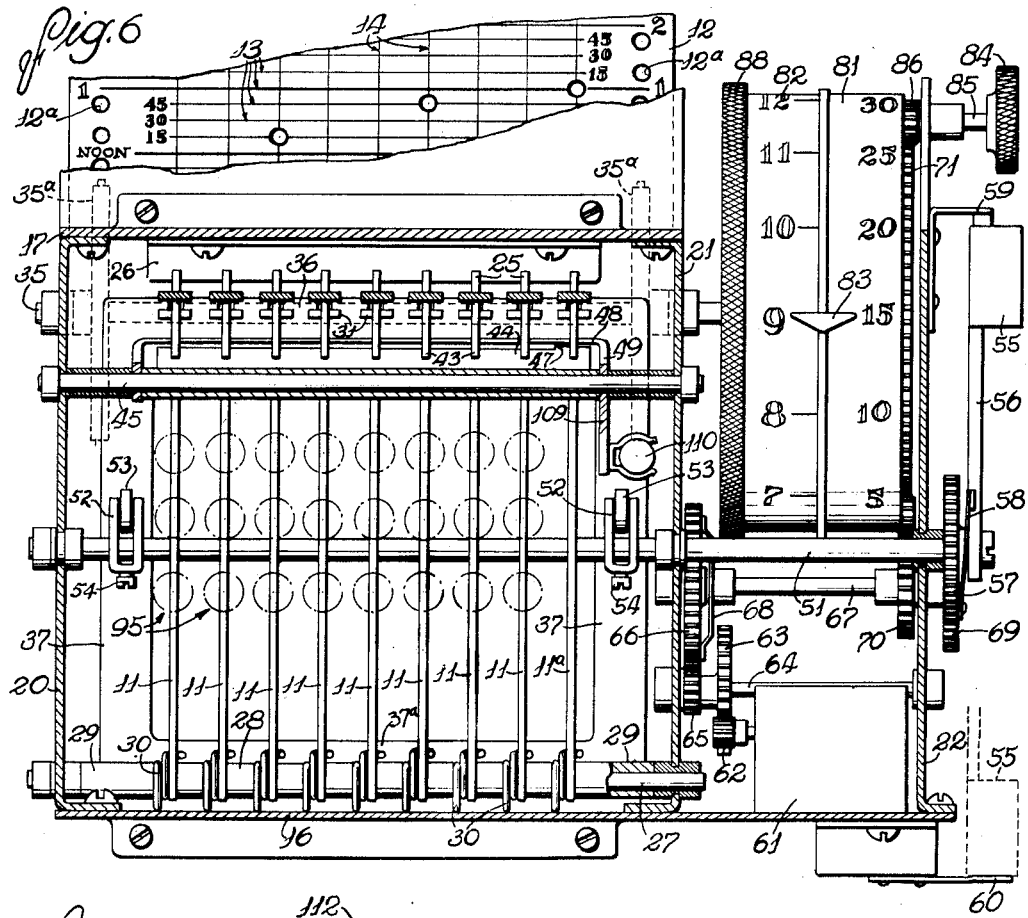
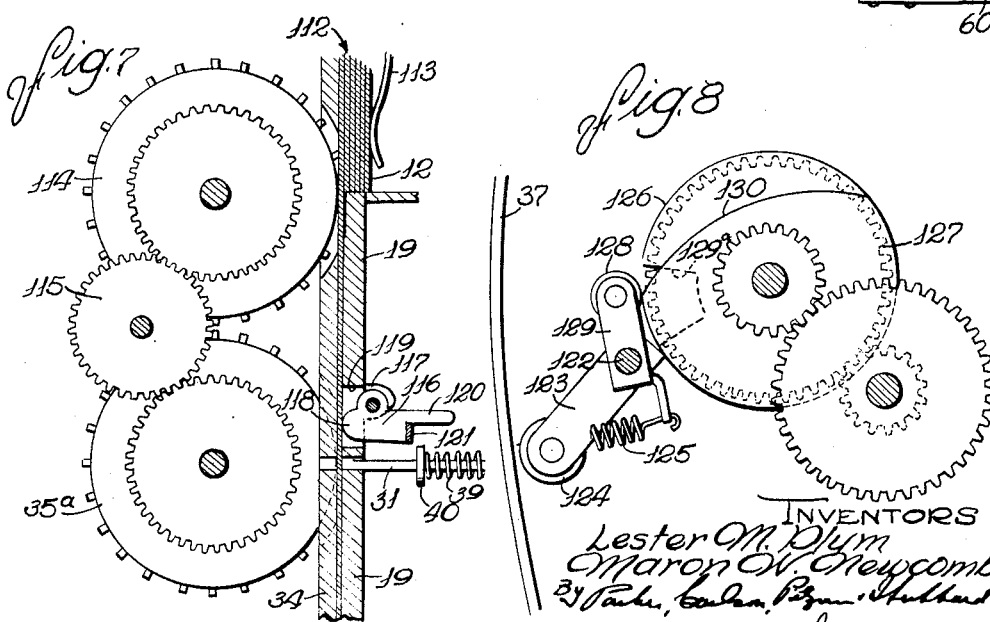
INVENTORS
Lester M. Plym
Maron N. Newcomb
ATTORNEYS Patented Dec. 10, 1940

2,224,609

UNITED STATES PATENT OFFICE 2,224,609

PROGRAM APPARATUS

Lester M. Plym and Maron W. Newcomb,
Glen Ellyn, Ill.

Application September 23, 1938, Serial No. 231,389

16 Claims. (Cl. 161—1)

The invention relates to time-controlled program apparatus generally, and more particularly to an improved program apparatus adapted to execute selected controlling functions at predetermined times in accordance with a definite program.

One object of the invention is to provide a program apparatus of the above general character having a relatively large capacity and wide range of adaptability which is of simple construction, inexpensive to manufacture, and efficient and reliable in operation.

Another object is to provide an improved program apparatus adapted to be controlled by simple perforated cards each designating a limited portion of the program of operations and which can be quickly and easily changed or replaced to vary the program.

Another object is to provide a card-controlled program apparatus in which power for periodically actuating the card reading mechanism is stored during inactive intervals, thereby permitting the use of a relatively small driving motor.

Another object is to provide an improved program apparatus adapted to be controlled either manually by means of push buttons or automatically under control of a perforated card.

Another object is to provide an improved time indicating and resetting mechanism for program apparatus.

Still another object is to provide an improved electrical circuit closer or switch particularly suitable for program apparatus.

A further object is to provide a program apparatus embodying improved means for sensing or reading the control data on a perforated card and for operating selected control elements in accordance with the data on the card.

Other objects and advantages of the invention will become apparent from the following detailed description of the preferred embodiment illustrated in the accompanying drawings, in which:

Figure 1 is a vertical sectional view of the operating mechanism of a program apparatus embodying the features of the invention.

Fig. 2 is a sectional view of the time indicating and resetting mechanism taken along the line 2—2 of Fig. 1.

Fig. 3 is a fragmentary perspective view of the control elements and associated operating mechanisms.

Fig. 4 is a sectional view taken along the line 4—4 of Fig. 1 showing details of the electrical switch.

Fig. 5 is a sectional view of the electrical switch structure taken along the line 5—5 of Fig. 4.

Fig. 6 is a vertical sectional view of the program apparatus taken along the line 6—6 of Fig. 1.

Fig. 7 is a view partly in section showing a modified form of the card feeding mechanism.

Fig. 8 is a fragmentary elevational view showing a modified form of the feeler actuating mechanism.

While the invention is susceptible of various modifications and alternative constructions, we have shown in the drawings and will herein describe in detail a preferred embodiment, but it is to be understood that we do not thereby intend to limit the invention to the specific form disclosed but intend to cover all modifications, adaptations and alternative constructions falling within the spirit and scope of the invention as defined by the appended claims.

The improved program apparatus comprises generally a series of individually operable control elements 11 adapted to be operated selectively at predetermined times under control of a perforated record strip 12. The control elements may be utilized for executing any desired controlling functions such as operating audible or visual signals, starting and stopping motors or other electrical devices, tuning radio sets, etc., at definite predetermined times. While any desired number of the control elements may be employed in a single program apparatus, the apparatus shown, by way of illustration, is equipped with nine control elements, thereby enabling it to control nine separate operations.

The record strip 12 may be of any suitable character. To facilitate changes in the program, it is preferred to employ for this purpose relatively small rectangular cards each of which represents a limited portion of the complete program of operations. For example, when the program extends over a period of a week or more, individual cards may be provided for shorter periods, such as for each day. Thus, a change in the program for a particular day may be made by simply replacing the card for that day with the new card perforated in accordance with the revised program.

The control data representing a preestablished program of operations preferably consists of perforations located in specific areas of the card. The record strip or card 12 is divided into transverse sections or zones by lines 13. These zones, which represent different time intervals such as quarter-hour intervals, are further divided into a series of smaller areas by vertical lines 14. The individual areas represent the different operations constituting the program. Each time zone of the card thus has an area for each operation to be performed. To set up the complete program, it is therefore only necessary to perforate appropriate areas in the various time zones. By feeding the card at the proper rate, the time zones may be presented in a controlling position successively at the particular instant represented by the zone.

The control elements and associated mechanisms constituting the improved program apparatus are assembled in a compact, unitary structure on a rigid box-like supporting frame of sheet metal or other suitable material. As shown in Figs. 1 and 6, the frame comprises a bottom plate 16 and a top plate 17 bolted or otherwise rigidly secured between a front plate 18 and a back plate 19. Side plates 20, 21 and 22 are secured to the other members of the frame to provide suitable bearing support for the rotating elements of the apparatus, as will appear presently.

The control elements 11, as shown in Figs. 1 and 3, consist of elongated, flat metal strips each formed at one end with a laterally projecting arm 23 and pivotally supported at the opposite end for movement between two positions. These positions are defined by spaced lugs 24 and 25 which project from the end of the strip and from the arm 23 respectively for engagement with a fixed stop 26 adjustably supported on the top plate 17 of the frame.

Pivotal support for the control elements 11 is provided by a rod 27 extending between the frame plates 20 and 21 closely adjacent the bottom of the frame structure. Spacing sleeves 28 (Fig. 6) interposed between the elements hold them in proper spaced relation longitudinally of the rod while other spacing sleeves 29 interposed between the outside elements and the adjacent frame plates hold the entire assembly in fixed position.

Individual coil springs 30 normally hold the control elements in a retracted or inoperative position with their lugs 24 in engagement with the stop 26. Movement of the elements to operated position is effected by a feeler mechanism cooperating with the record strip or card 12. This mechanism in its preferred form comprises a feeler 31 individual to each control element 11 and operatively connected thereto. As shown in Fig. 3, the operative connection between the feeler and its associated control element is provided by an elongated slot in the enlarged forward end of the feeler adapted to receive the lug 24 of the control element. The slot is of sufficient length to permit the feeler to be returned to normal position while the control element remains in operated position.

The feelers 31 are slidably supported for endwise movement in suitable apertures 33 in the back plate 19 of the frame. As shown in Fig. 1, the plate 19 forms one wall of a channel or guideway for the record card 12, the other wall of the guideway being formed by a back plate 34 suitably secured to the plate 19. The two plates are spaced apart sufficiently to permit the card to pass between them. Apertures 34a in the plate 34 alined with the apertures 33 provide clearance for any feeler which passes through the card. In their normal positions shown in Fig. 1, the feelers extend into the plate 19 but not entirely through it so that the record card may be moved along the guideway without interference. Such movement of the record strip is effected by means of a feed mechanism including a shaft 35 having sprocket wheels 35a engaging feed holes 12a in opposite edges of the card. The plates 19 and 34 are slotted as shown in Fig. 1 to receive the sprocket wheels. Suitable power actuated timing mechanism, to be described hereinafter, is provided for driving the shaft so as to feed the card 12 along the guideway continuously and at a uniform rate.

Movement of the feelers 31 toward and from the card 12 to read or analyze the same is effected by a common actuator herein shown as a horizontally disposed angle bar 36 having suitable slots 36a formed in one edge for the reception of the feelers. The actuator bar may be formed at one edge of a flat plate punched out centrally to form side members 37 connected by a transverse web 37a pivoted on a rod 38 anchored in the frame structure. The actuator bar may therefore be moved toward and from the perforated card by rocking the plate about the pivot rod 38.

Power actuated means is provided for periodically shifting the actuator 36 toward the record strip in timed relation to the feed thereof so as to carry the feelers into engagement with the card. As herein shown, each feeler 31 is yieldably connected with the actuator by means of a compression spring 39 secured at one end to a collar 40 fast on the feeler and at the other end to a collar 41 slidable relative to the feeler and rigid with the bar 36. The feelers thus move with the actuator bar until blocked by encountering an imperforate area of the card 35 whereupon the springs 39 yield to permit the actuator to move through its full stroke.

Any feeler not blocked by the card, that is, one which finds a perforation in the card, advances through the full stroke of the actuator and draws the associated control element 11 rearwardly into operated position. Movement of the control element is limited by the lug 25 engaging the fixed stop 26. Return of the actuator bar toward retracted position is effected by the springs 39 of the feelers which are blocked by the card. Due to the elongated form of the slot 32, this movement of the bar does not restore the control elements, such restoration being effected by the individual restoring springs 30. The control elements may, therefore, be held in operated position without interfering with the operation of the feeler mechanism.

In some instances, it may be desirable to hold the control element in operated position for an extended period as, for example, between successive readings of the card. Means is therefore provided for latching certain of the elements in operated position and for releasing the elements automatically when another element is operated. For this purpose, the arm 23 of each control element is formed at its outer end with a downward projecting tip 43 (Figs. 1 and 3) adapted to cooperate with a latch member 44. As herein shown, the latch member comprises an elongated flat bar secured along one edge to a rock shaft 45 journaled in the frame plates 20 and 21. The rock shaft is arranged below and slightly in front of the arms 23 so that the free edge of the latch member may be rocked into the path of the tips 43 of these arms and thereby prevent movement of the elements from operated to retracted position. A tension spring 46 (Fig. 1) tends to hold the latch member in latching position.

Upon movement of a control element to operated position, the tip 43 cams the latch member 44 downwardly to release any previously latched control element. As soon as the tip clears the latch member, it is returned to latching position by the spring 46 and is thereby rendered effective to latch the last operated element in its operated position until another control element is operated.

Provision for terminating the operation of the program apparatus is made by arranging one of the control elements, such as the element 11a (Fig. 3) so that it can be operated to release a latched control element without being itself latched in operated position. For this purpose, the latching member 44 is formed with a forwardly projecting edge portion 47 which prevents the tip 43 of the element 11a from dropping over the edge of the latch bar and thereby renders the bar ineffective to block the return movement of the element 11a. The latch bar, however, is depressed upon the movement of the element 11a to operated position, thus releasing any previously latched control element.

Power actuated means is provided for operating the feeler actuator bar 36 in timed relation to the movement of the perforated card 12 so as to read successive areas of the card in its movement through the guideway. Since the record strip is fed continuously, the feelers 31 must be advanced and retracted in a relatively short portion of the interval between successive readings. The preferred means for shifting the feeler actuator accordingly comprises a shaft 51 journaled in the frame plates 20, 21 and 22, having spaced crank arms 52 which carry cam rollers 53 adapted to engage the actuator supporting members 37 in the rotation of the shaft. As herein shown, the crank arms 52 are formed as separate yokes and are removably secured to the shaft by means of set screws 54 to facilitate assembly of the apparatus.

In order to properly time the operation of the feelers with the movement of the card 12, the shaft 51 must be rotated at a nonuniform rate, that is, that portion of the revolution in which the rollers 53 engage the actuator springs must be executed rapidly while the remaining portion of the revolution may be executed at a much slower rate. This rotation may be conveniently imparted to the shaft by the pendulum action of a weight 55 carried on a radial arm 56 rigidly secured to the end of the shaft.

The arm 56 is rocked in a counterclockwise direction, as viewed in Fig. 1, to raise the weight 55 to its uppermost position by rotation of a gear wheel 57 loosely mounted on the shaft 51. A driving member 58 in the form of an arcuate spring secured in one end to the gear and having the other end disposed in the path of the arm provides a one-way driving connection for this purpose and yet permits the arm or gear to be rotated freely in the opposite direction for adjusting or resetting the apparatus.

When the apparatus is in operation, the gear 57 is driven continuously at a rate such that it makes one revolution while the card 12 is being advanced from one time area to the adjacent time area. This rotation is synchronized with the feed of the card so that the weight 55 is moved past the over-center position at the instant that the perforations in the time area to be analyzed are alined with the apertures 33 and 34a. A spring 59 carried on the frame plate 17 frictionally engages the weight until the over-center position is reached and thus prevents premature dropping of the weight. When the weight is moved out of engagement with the spring, it falls quickly, and through the medium of the crank arms 52 and rollers 53 momentarily forces the actuator bar 36 and feelers 31 toward the perforated card. Any feeler encountering a perforation of the card operates its associated control element in the manner hereinbefore explained. Oscillation of the weight 55 at the end of its downward stroke is prevented by a friction brake 60 positioned to engage the weight at its lowest point of travel.

The actuator operating mechanism above described is particularly advantageous in that it provides a means for storing power during inactive intervals of the apparatus or while the perforated card is being advanced to present the next set of perforations to the feelers. Accordingly, a single relatively small timing motor may be employed both for feeding the perforated card and for operating the feelers. As herein shown, an electric motor 61 of the synchronous or sub-synchronous type is provided for this purpose. The motor is drivingly connected with the weight lifting gear 57 through the medium of a speed reducing gear train which, as herein shown, includes a pinion 62 on the motor shaft meshing with a gear 63 on a shaft 64 journaled in the frame plates 21 and 22. A gear 65 fast on the shaft 64 drives a gear 66 loosely mounted on a shaft 67 and drivingly connected thereto with a spring actuated friction clutch 68. A gear 69 fast on the shaft 67 meshes with the gear wheel 57 and drives the same at the proper speed which, in this instance, is one revolution in fifteen minutes.

The card feeding mechanism is driven by the motor 61 through the speed reducing gear train above described and an additional gear train including a gear 70 fast on the shaft 67 which drives gear 71 through an idler gear 72 (Fig. 1). The gear 71 is pinned to a sleeve 73 rotatably supported on the sprocket wheel shaft 35. A spur gear 74 formed integrally with the sleeve 73 drives an intermediate gear 75 fast on a stub shaft 76 which carries a pinion 77 arranged to drive a gear 78 loosely mounted on the shaft 35. A spring 79 interposed between a collar on the shaft 35 and the gear 78 holds the gear in frictional engagement with a disk 80 fast on the shaft 35 and thus provides a driving connection between the gear and the shaft. Through the medium of the various gears, the shaft 35 is driven at a speed such that the sprockets will feed the card 12 downwardly at the desired rate, that is, so that a new time zone of the card is presented opposite the feelers every fifteen minutes.

To facilitate the initial setting of the apparatus or resetting after a change of perforated cards, a time indicating and resetting mechanism may be associated with the card feeding mechanism above described. As shown in Figs. 2 and 6, the time indicating mechanism comprises a pair of indicator drums 81 and 82 supported at one end of the sprocket wheel shaft 35 in side-by-side relation. The drums 81, conveniently termed the "minute" drum is fixed to the sleeve 73 while the drum 82 or "hour" drum is carried by the disk 80 for rotation with the shaft 35. When the apparatus is arranged for the use of perforated cards covering a twelve-hour period, the timing motor is arranged to drive the shaft 35 through one complete revolution in this period while the sleeve 73 makes twelve revolutions or one revolution per hour. Thus, the two indicator drums are rotated in timed relation to indicate the time represented by the different zones of the perforated card as it is fed past the feelers. A stationary pointer 83 cooperating with the time indicia on the indicator drums facilitates accurate setting of the same.

Since a perforated card may be placed in the apparatus at any time, it may be necessary to change the setting of the indicator drums to correspond with the operative zone of the card. Means is accordingly provided for setting the minute drum 81 independently of the timing motor. The setting means, as herein shown, comprises a knob 84 fixed on the end of the shaft 85 which carries a pinion 86 meshing with the gear 71. The latter gear, as previously explained, is pinned to the sleeve 73. Thus, by turning the knob 84, the minute drum may be set in any desired position. Due to the provision of the clutch 68, this movement is not transmitted back to the timing motor.

In order to properly coordinate the setting of the drums 81 and 82, means is provided for confining the movement of one drum relative to the other to steps of predetermined length. This means, as herein shown, comprises a plurality of inwardly projecting bosses 87 formed in the disk 80 and arranged to engage in complementary recesses in the face of the gear 78. In order to maintain the proper angular relationship between the two indicator dials at all times, twelve of the bosses 87 are provided so that rotational movements of the drum and shaft 35 relative to the gear 78 and drum 82 are confined to twelve steps of thirty degrees each. In this way, the indicator drums may be accurately coordinated with any selected time zone on the perforated card which is positioned for engagement by the feelers. A knurled rim 88 is formed at one edge of the disk 80 to facilitate the setting.

To provide for emergency changes in the preestablished program of operations, auxiliary operating means may be incorporated in the program apparatus to enable the control elements to be operated manually when desired. The auxiliary operating means in its preferred form comprises a series of push buttons 91 (Figs. 1 and 3) each operatively connected with one of the control elements 11 by a rigid bar 92 slotted as at 93 to receive the upstanding lug 25 of the associated element. The push buttons are arranged to project partially through a slot 94 in the front plate 18 of the frame structure so as to be readily accessible from the front of the apparatus. To conserve space and yet provide sufficient area for convenient finger operation, the buttons are of generally triangular cross section with alternate buttons oppositely faced as shown in Fig. 3.

In the particular embodiment illustrated, the push buttons 91 are arranged in a substantially horizontal position, that is perpendicular to the vertical front plate 18. However, the lug and slot connection permits the push buttons to be tilted at an angle to the horizontal so that they may be used with an inclined front plate, if desired, without requiring any structural changes.

The control elements 11 may be arranged to execute their controlling functions either directly through the medium of suitable mechanical connections or indirectly by means of electrical circuit controllers or switches. In the exemplary embodiment, each control element is provided with three normally open electrical switches 95, although it will be understood that any desired number of switches may be employed. The switches are supported in operative relation to the control elements by a metal bracket 96 carried on the frame structure.

While the switches 95 may be of any suitable type, the invention provides a switch of novel and advantageous construction particularly suitable for program apparatus by reason of its efficient and reliable operation. Referring to Figs. 4 and 5, the switch in its preferred form comprises a stationary contact member 97 and a movable contact member 98. The member 97 is preferably annular and may be conveniently formed as an eyelet adapted to be crimped in an aperture in an insulating plate 99 mounted on the bracket 96. A tab 100 formed integrally with the eyelet constitutes a connecting terminal for an electrical conductor 101 which may be soldered or otherwise suitably secured thereto.

The movable contact member 98 comprises an elongated rigid body terminating in an enlarged end portion 102 of generally triangular cross section. The enlarged end portion thus presents three outwardly facing inclined contact edges for engagement with the stationary contact. The member 98 may be conveniently formed from suitable bar stock by expanding the end portion in a die of appropriate shape.

As shown in Fig. 5, the movable contact member 98 is assembled in axial relation to the annular contact member 97 and supported for endwise movement relative thereto in an aperture 103 in the back wall of the bracket 96. A supporting and guiding plate 104 of insulating material carried on the bracket acts to center the enlarged end portion in the annular contact 97. The supporting plate is apertured to receive the contact member with a loose fit which permits sufficient lateral movement of the member to enable the three contact edges to engage the stationary contact with substantially equal pressure.

Pinned or otherwise suitably secured to the inner end of the movable contact member 98 is a bearing plate 105 adapted to bear against the associated control member 11. A compression spring 106 interposed between the bearing plate and the bracket 96 tends to hold the plate in engagement with the control element and acts to move the contact member to circuit closing position when the control element is rocked to operated position. The tension of the spring 106 is such that the contact member is moved to open circuit position upon the retraction of the control element by its restoring spring 30.

In the particular form illustrated, the movable switch members 98 of all of the switches are electrically connected with a common terminal 107 through the medium of the metal bracket 96. The springs 106 assist in providing an electrical connection between the members and the bracket. A conductor 108 connected with the terminal 107 thus supplies operating current to all of the switches 95.

Means is also provided for completing a control circuit as long as any control element is in operated position. For this purpose, a bail 48 is arranged closely adjacent and parallel to the free edge of the latch bar 44. The bail is pivotally supported on the shaft 45 by arms 49 one of which is formed with an extension 109 (Fig. 6). Mounted on the extension 109 is a mercury contact switch 110 adapted to be operated to circuit closing position by depression bail 48. The position of the bail is such that the tip 43 of any control element 11 in operated position is effective to hold the bail depressed and thus complete a control circuit by way of conductors 111 and 111a. This switch mechanism thus provides a means for starting and stopping the device operated under the selective control of the elements 11 and their associated switches.

The perforated cards 12 may be presented to the feeding mechanism individually by manually placing the same in the upper end of the guideway or by means of an auxiliary feed mechanism arranged to remove the cards successively from a suitable storage magazine. As shown in Fig. 7, a magazine 112 capable of holding a plurality of the perforated cards may be mounted on the frame immediately above the guideway formed by the plates 19 and 34. The cards 12 in the magazine are pressed rearwardly by a spring 113 against an extension of the plate 34 which forms the back wall of the magazine. The rearmost card is engaged by sprocket wheels 114 driven directly by the sprocket wheels 35a through an intermediate driving gear 115. The sprocket wheels 114 thus withdraw the cards from the magazine one by one and feed them into the guideway until engaged by the sprockets 35a whereupon the feed is continued in the manner hereinbefore described.

Suitable means is provided for locking the control elements in an inoperative position in the absence of a card in the guideway. As shown in Fig. 7, this means comprises a latch 116 pivoted on a bracket 117 projecting forwardly from the back plate 19. The latch 116 is formed with a rounded nose 118 projecting through a slot 119 in the back plate and engaging the card in the guideway. In the absence of a card, the latch is rocked about its pivot by reason of a counterweight 120 formed integrally therewith, and when so rocked, presents a latch bail 121 in the path of the collars 40 of each feeler. Thus, the feelers are blocked against movement and the control elements are maintained in inoperative position.

Referring now to Fig. 8, there is shown a modified driving mechanism for operating the feeler actuator which may be employed instead of the drive mechanism, hereinbefore described, when sufficient power is available. The modified mechanism, as herein shown, comprises a rock shaft 122 mounted in the bearings provided for the shaft 51 and having spaced operating arms 123 carrying rollers 124 adapted to engage the feeler actuator supporting members 37 when the shaft is rocked about its pivot. A tension spring 125 normally tends to rock the shaft 122 in a direction such as to shift the feeler actuator into operated position.

The shaft 122 is normally held with the operating arms in retracted position by a pair of timing cams 126 and 127 cooperating with a cam follower in the form of a roller 128 carried on an arm 129 rigid with the shaft. The cams are arranged to be driven continuously at different speeds but in timed relation by the timing motor 31 and are formed so as to momentarily release the shaft 122 to the action of its spring 125 at definite intervals. To this end, the periphery of the cam 126 is formed with a slot 129a of sufficient width to permit the roller 128 and allow the roller 124 to engage the member 37. This slot is periodically presented to the roller by the rotation of the cam. The companion cam 127 is formed with a low portion 130 of substantially the same depth as the slot 129a but with a slope such as to impart uniformly accelerated and decelerated motion to the cam follower. Thus when the cams are in proper phase relation, the slot 129a of the cam 126 is positioned to receive the cam roller 128 as the low portion 130 of the cam 127 is rotated into and out of registry with the slot. The spring 125 accordingly acts to rock the shaft 122 and advance the feeler actuator.

When employing perforated cards similar to the cards 12 hereinbefore described, the cam 126 is rotated at the rate of one revolution in fifteen minutes so that the slot 129a is positioned to receive the cam roller 128 only for a short interval in each fifteen-minute period. The cam 127, on the other hand, is rotated at a substantially higher speed as, for example, at the rate of one revolution per minute. The cam roller 128 is therefore released for movement into the slot 129a in the portion of the short interval in which the low point 130 of the cam 127 registers with the slot. With the particular cams shown, the roller is released and returned to normal position in the time taken for the cam 127 to rotate through approximately one-third of a revolution. In this way, the feelers are quickly advanced and retracted so that they cannot interfere with the feed movements of the perforated card.

It will be apparent from the foregoing that the invention provides an improved program apparatus of novel and improved construction adapted for either directly or indirectly effecting selected controlling functions at predetermined times in accordance with a definite program. The apparatus is controlled by simple perforated cards which can be quickly and easily changed or replaced to vary the program as desired. Relatively little power is required for operating the apparatus by reason of the provision of novel means for storing power during inactive intervals and releasing this stored power periodically to actuate the card reading mechanism.

The improved program apparatus is adapted to be operated manually when emergency changes in the preestablished program are required. Further, the apparatus may be reset quickly and easily when changing or replacing the perforated cards. Due to its simple, sturdy construction, the apparatus is inexpensive to manufacture and efficient and reliable in operation.

We claim as our invention:

1. In a perforated card-controlled program apparatus, in combination, a plurality of feelers, feed mechanism for feeding a perforated card relative to said feelers at a uniform rate, a continuously operating motor for driving the feed mechanism, actuating means for moving said feelers into engagement with the card to analyze the same, a rotatable shaft, a weighted arm secured to the shaft, means providing a driving connection between said continuously operating motor and said shaft whereby the shaft is turned slowly through a portion of a revolution to raise the weighted arm to its upper position, said weighted arm falling freely from its upper position to turn the shaft rapidly through the remainder of its revolution, and means carried by said shaft for momentarily operating said feeler actuating means while the shaft is turning through said remainder of its revolution.

2. In a perforated card-controlled program apparatus, in combination, a plurality of feelers, feed mechanism for feeding a perforated card relative to said feelers, a continuously operating motor for driving the feed mechanism, actuating means for moving said feelers into engagement with the moving card to analyze the same comprising, a rotatable shaft, means providing a driving connection between said shaft and said motor whereby the shaft is turned slowly through a portion of a revolution and rapidly through the remainder of its revolution, and means actuated by said shaft in turning through said remainder of its revolution for momentarily operating said feeler actuating means.

3. In a perforated card-controlled program apparatus, in combination, a plurality of feelers, feed mechanism for feeding a perforated card relative to said feelers, a continuously operating motor for driving the feed mechanism, actuating means for moving said feelers into engagement with the moving card to analyze the same, a rotatable shaft, means for storing energy derived from said motor, and means for periodically releasing the stored energy to momentarily operate said feeler actuating means.

4. In a perforated card-controlled program apparatus, in combination, a plurality of feelers, feed mechanism for feeding a perforated card relative to said feelers, a continuously operating motor for driving the feed mechanism, actuating means for moving said feelers into engagement with the card to analyze the same, a rotatable shaft, a pair of cams arranged to be driven at different speeds by said motor, said cams being effective when in predetermined phase relation for rocking said shaft, and means actuated by the shaft for operating said feeler actuating means.

5. In a perforated card-controlled program apparatus, in combination, a plurality of control elements, means for continuously feeding a perforated card at a uniform rate, means operable periodically to momentarily feel the moving card and thereby operate a selected control element in accordance with a perforation found therein, means for latching the selected control element in operated position, and means operated incident to the subsequent selection and operation of a different control element for unlatching the first control element.

6. In a perforated card-controlled program apparatus, in combination, a plurality of control elements, means for continuously feeding a perforated card at a uniform rate, means operable periodically to momentarily feel the moving card and thereby operate a selected control element in accordance with a perforation found therein, a latch operative to hold the selected control element in operated position, and means for momentarily disengaging said latch upon movement of another control element to operated position whereby to release the first control element and latch said another element in operated position.

7. In a perforated card-controlled program apparatus, in combination, a series of control elements, a feeler for each element, a guideway for perforated cards to be analyzed by the feelers, means for periodically advancing and retracting the feelers to analyze the card in the guideway, said feelers being operative on encountering a perforation in the card to move the associated control element into operated position, and means rendered effective by the absence of a card from the guideway for latching the feelers in a retracted position.

8. In a perforated card-controlled program apparatus, in combination, card feeding mechanism including a shaft, a sprocket wheel on the shaft engageable with feed holes in the perforated card, a time indicating mechanism operatively associated with said feeding mechanism comprising an hour indicating drum mounted on said shaft for rotation therewith, a minute indicating drum loosely mounted on said shaft, means for rotating said drums in definite timed relation, and means for effecting predetermined angular displacement of said first drum relative to said second drum to insure proper timed relation of the drums when the indicating mechanism is reset.

9. In a perforated card-controlled program apparatus, in combination, card feeding mechanism including a shaft having a sprocket wheel engaging feed holes in the card, a sleeve rotatably mounted on said shaft, a timing motor for rotating said sleeve at a uniform rate, gearing interconnecting said sleeve and said shaft operative to rotate the shaft in timed relation to said sleeve, time indicating mechanism comprising a first indicating drum mounted on said shaft for rotation therewith, and a second indicating drum rotatable with said sleeve, said first drum being adjustable angularly relative to said sleeve for resetting the indicating mechanism.

10. In a perforated card-controlled program apparatus, in combination, card feeding mechanism including a shaft having a sprocket wheel engaging feed holes in the card, a sleeve rotatably mounted on said shaft, a timing motor for rotating said sleeve at a uniform rate, gearing interconnecting said sleeve and said shaft operative to rotate the shaft in timed relation to said sleeve, time indicating mechanism comprising a first indicating drum mounted on said shaft for rotation therewith, said drum being adjustable angularly relative to the sleeve for coordinating the same with a selected area of the card, a second indicating drum rotatable with said sleeve, and manually operable means for rotating said sleeve independently of the timing motor for coordinating the second drum with the selected area of the card.

11. A program device having, in combination, a plurality of control elements, push buttons individually associated with said elements for manually operating the elements, a perforated card feeler for each element, power operated means for periodically advancing the feelers under control of a perforated card, and means operatively connecting each feeler with its associated control element to render the feeler effective upon advancing through the card to operate the element, said connecting means being ineffective to advance the feeler when the control element is operated by its associated push button.

12. A program device having, in combination, a plurality of control elements supported for independent movement, means tending to hold said elements in a retracted position, a push button associated with each element and manually operable to move the element from retracted position to operated position, a perforated card feeler for each element, power operated means for advancing the feelers under control of a perforated card, and a lug on each element engageable in a slot in the associated feeler for moving the element to operated position incident to the advance of the feeler, said slot being formed to allow the feeler to remain in normal position when the element is moved to operated position by its associated push button.

13. In a program apparatus of the type adapted to be controlled by cards having perforations arranged in zones representing successive time intervals, the combination of a set of card sensing feelers, mechanism for feeding cards relative to the feelers comprising a shaft, a timing motor for driving said shaft, a feeding element operable by said shaft for advancing a card to present the time zones of the card in succession to said feelers, a rotatable member mounted on said shaft having time indicating indicia, means providing an adjustable driving connection between the member and the shaft, and means included in said connecting means maintaining a predetermined relationship between the member and the shaft to coordinate the time indicia of the member with the time zone of the card presented to said feelers.

14. In a program apparatus of the type adapted to be controlled by cards having perforations arranged in zones representing successive time intervals, the combination of a set of card sensing feelers, mechanism for feeding cards relative to the feelers comprising a shaft, a timing motor for driving said shaft, a feeding element operable by said shaft for advancing a card to present the time zones of the card in succession to said feelers, an indicating member rotatably mounted on said shaft, said member having time indicating indicia, means disengageably connecting said member with the shaft for rotation together, said member being rotatable relative to the shaft when the connecting means is disengaged, and means included in said connected means for locating the member in predetermined angular relationship of the shaft upon engagement of the connecting means to coordinate the time indicia on the member with the time zone of the card presented to the feelers.

15. A perforated card controlled machine having, in combination, a plate forming one wall of a guideway for a perforated card, means for feeding the card along the guideway, a set of feelers supported for movement toward and from the plate, said plate being apertured for the reception of the feelers to enable them to engage a card in their forward movement to sense the perforations therein, periodically operating means for imparting forward movement to the feelers, and latch means automatically operative in the absence of a card from the guideway for preventing the feelers from moving through the plate and into the guideway.

16. A perforated card controlled machine having, in combination, a plate forming one wall of a guideway for a perforated card, means for feeding the card along the guideway, a set of feelers supported for movement toward and from the plate, said plate being apertured for the reception of the feelers to enable them to sense the perforations in the card as an incident to their forward movement, an actuator for the feelers, means for periodically operating said actuator, means providing a yieldable connection between the feelers and the actuator and effective to impart the movements of the actuator to the feelers, and a latch having a part arranged to cooperate with the card in the guideway and another part adapted to coact with the feelers to prevent their advance by the actuator, said other part being normally held in an inactive position when the first part of the latch is engaging a card in the guideway.

LESTER M. PLYM.
MARON W. NEWCOMB.